(12) United States Patent
Jung

(10) Patent No.: US 8,128,056 B2
(45) Date of Patent: Mar. 6, 2012

(54) FLOW CONTROL VALVE

(75) Inventor: Taekyu Jung, Daejeon (KR)

(73) Assignee: Korea Aerospace Research Institute (KR)

( * ) Notice: Subject to any disclaimer, the term of this patent is extended or adjusted under 35 U.S.C. 154(b) by 373 days.

(21) Appl. No.: 12/547,205

(22) Filed: Aug. 25, 2009

(65) Prior Publication Data

US 2010/0051840 A1 Mar. 4, 2010

(30) Foreign Application Priority Data

Sep. 2, 2008 (KR) .................. 10-2008-0086334

(51) Int. Cl.
*F16K 3/26* (2006.01)
(52) U.S. Cl. ............... 251/30.01; 251/129.03; 251/205; 251/250
(58) Field of Classification Search ............... 251/30.01, 251/120, 121, 129.03, 205, 250
See application file for complete search history.

(56) References Cited

U.S. PATENT DOCUMENTS

| | | | | |
|---|---|---|---|---|
| 2,071,204 A | | 2/1937 | Hunt | ................... 251/8 |
| 4,114,743 A | * | 9/1978 | Sink et al. | ................... 192/85.15 |
| 4,997,159 A | * | 3/1991 | Yoshino et al. | ................... 251/29 |
| 6,196,477 B1 | | 3/2001 | Halltorp | |
| 6,843,466 B1 | * | 1/2005 | Chuang | ................... 251/207 |
| 2005/0230655 A1 | * | 10/2005 | Chen | ................... 251/344 |
| 2006/0130914 A1 | * | 6/2006 | Barber | ................... 137/625.64 |

FOREIGN PATENT DOCUMENTS

CH 229257 3/1941

OTHER PUBLICATIONS

European Search Report, dated Mar. 7, 2011 (4 pgs).

* cited by examiner

*Primary Examiner* — John Bastianelli
(74) *Attorney, Agent, or Firm* — Hayes Soloway P.C.

(57) ABSTRACT

Provided is a flow control valve including: a valve body including a flow passage; a first poppet being fixed within the valve body, and including an inlet port through which a fluid flows in and an outflow hole through which the fluid flows out to the flow passage; a second poppet being fixed within the valve body, and including an outlet port through which the fluid flows out and an inflow hole through which the fluid flows in from the flow passage; a sleeve sliding along the first poppet to close the outflow hole and regulate an area thereof; and a spool being disposed between the first and second poppets to be slidable along the first and second poppets, being elastically supported by the second poppet, and sliding due to a pressure of the fluid flowing in the first poppet to close the inflow hole and regulate an area thereof.

6 Claims, 3 Drawing Sheets

FLOW CONTROL VALVE

CROSS-REFERENCE TO RELATED APPLICATION

This application claims the benefit of Korean Patent Application No. 10-2008-0086334, filed on Sep. 2, 2008, in the Korean Intellectual Property Office, the disclosure of which is incorporated herein by reference.

BACKGROUND

1. Field of the Invention

The present invention relates to a flow control valve, and more particularly, to a flow control valve that may reduce a weight of a valve and may maintain a constant flow rate at all times regardless of a sudden pressure change in an inlet and an outlet of the valve.

2. Description of the Related Art

Generally, a flow control valve may be used for many industries such as a nuclear power plant, a thermal power plant, a ship, an airplane, a rocket engine, and the like.

A liquid propellant rocket denotes an aviation device that may mix a liquid fuel and an oxidizer, burn the mixture in a combustion chamber, discharge an exhaust gas through a nozzle, and thereby obtain a propulsive force due to an action-and-counteraction principle. The liquid propellant rocket may easily control the propulsive force using valves and pumps. Due to this aspect, the liquid propellant rocket is more popular than a solid propellant rocket. To adjust the propulsive force of the liquid type rocket, there is a need to regulate a flow rate of the fuel and the oxidizer supplied to the combustion chamber. For this, a flow control valve may be required.

When the flow control valve is used for ground systems and the like, an increase in weight may not become an issue. However, when the flow control valve is used for a ship, an airplane, a rocket, and the like, fuel efficiency may deteriorate as the flow control valve becomes heavier. Accordingly, the lighter the flow control valve, the better.

In a conventional art, a poppet valve is generally used for the flow control valve. The poppet valve may install a poppet member to perform a reciprocal motion in a flow passage of the valve, and thereby may control a valve opening while selectively opening or closing the flow passage according to a movement of the poppet member.

Specifically, the flow control valve according to the conventional art may control the poppet member to vertically move with respect to a flow direction of fluid and thereby may regulate an area of the flow passage of the valve to control a flow rate of the fluid.

However, when upwardly and downwardly moving the poppet member, the conventional flow control valve needs a great amount of force due to a flow induced force acting on the poppet member. Thus, an actuator may need to be increased in size.

Also, a drive force for the actuator may need to be increased due to the flow induced force on the poppet member. Accordingly, a configuration of the actuator may become more complex and heavier. In addition, the actuator may not be readily controlled and may easily malfunction.

Also, when an abnormal and sudden pressure change occurs in an inlet or an outlet of the flow control valve due to a disturbance, it may cause a radical change in a flow rate, which may result in endangering the stability of a system.

SUMMARY

An aspect of the present invention provides a flow control valve that may decrease a drive force of an actuator regulating a flow rate of a flow control valve to thereby reduce a size of the actuator and the entire weight of the flow control valve, and may also absorb a change in pressure using a compensation instrument to thereby maintain a constant flow rate at all times even when a sudden pressure change occurs in an inlet or an outlet of the flow control valve.

According to an aspect of the present invention, there is provided a flow control valve including: a valve body including a flow passage; a first poppet being fixed within one side of the valve body, and including an inlet port through which a fluid flows in and an outflow hole through which the fluid flows out to the flow passage of the valve body; a second poppet being fixed within another side of the valve body, and including an outlet port through which the fluid flows out and an inflow hole through which the fluid flows in from the flow passage of the valve body; a sleeve sliding along an outer circumferential surface of the first poppet by an actuator to close the outflow hole of the first poppet and to regulate an area of the outflow hole; and a spool being disposed between the first poppet and the second poppet to be slidable along the outer circumferential surface of the first poppet and the second poppet, being elastically supported by the second poppet, and sliding due to a pressure of the fluid flowing in the first poppet to close the inflow hole of the second poppet and to regulate an area of the inflow hole.

Here, the spool may be provided in a form of a pipe of which both ends are open, and may include a partition wall to divide the spool into two portions. Another side of the first poppet and another side of the second poppet may be inserted into both open ends of the spool, respectively. A first chamber may be formed between the other side of the first poppet and the partition wall of the spool to be connected with the first poppet. An elongated hole through which the fluid flows in and out may be formed in the other side of the first poppet.

Also, a second chamber may be formed between the other side of the second poppet and the partition wall of the spool. A spring may be provided within the second chamber to elastically support the spool. A connecting hole may be formed in the spool to connect the second chamber with the flow passage of the valve body.

Also, a guide hole may be formed in the partition wall of the spool. The other side of the first poppet and the other side of the second poppet may be connected with a guide bar passing through the guide hole of the partition wall to guide sliding of the spool. An internally protruded protrusion may be formed in the first poppet. An inlet of the elongated hole may be formed in the protrusion and an outlet of the elongated hole is formed in the guide bar.

Also, a rack may be provided on one surface of the sleeve. The actuator may include a pinion that is engaged with the rack of the sleeve to be rotated by a drive unit.

Also, the drive unit may include a direct current (DC) electric motor.

EFFECT

According to embodiments of the present invention, there is provided a flow control valve that may form a sleeve, regulating a flow rate of the flow control valve, to have a thin thickness and thus may decrease a flow induced force caused by a pressure of a fluid acting on the sleeve. Through this, since a drive force moving the sleeve may decrease, it is possible to move the sleeve using a small actuator and thereby reduce a weight of the flow control valve.

Also, according to embodiments of the present invention, it is possible to drive a sleeve using a rack and a pinion, and thus accurately control a flow rate.

Also, according to embodiments of the present invention, even when a sudden pressure change occurs in an inlet port of a first poppet or an outlet port of a second poppet, a spool close or open an inflow hole to thereby regulate an area of the inflow hole. Through this, it is possible to maintain a constant flow rate at all times.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
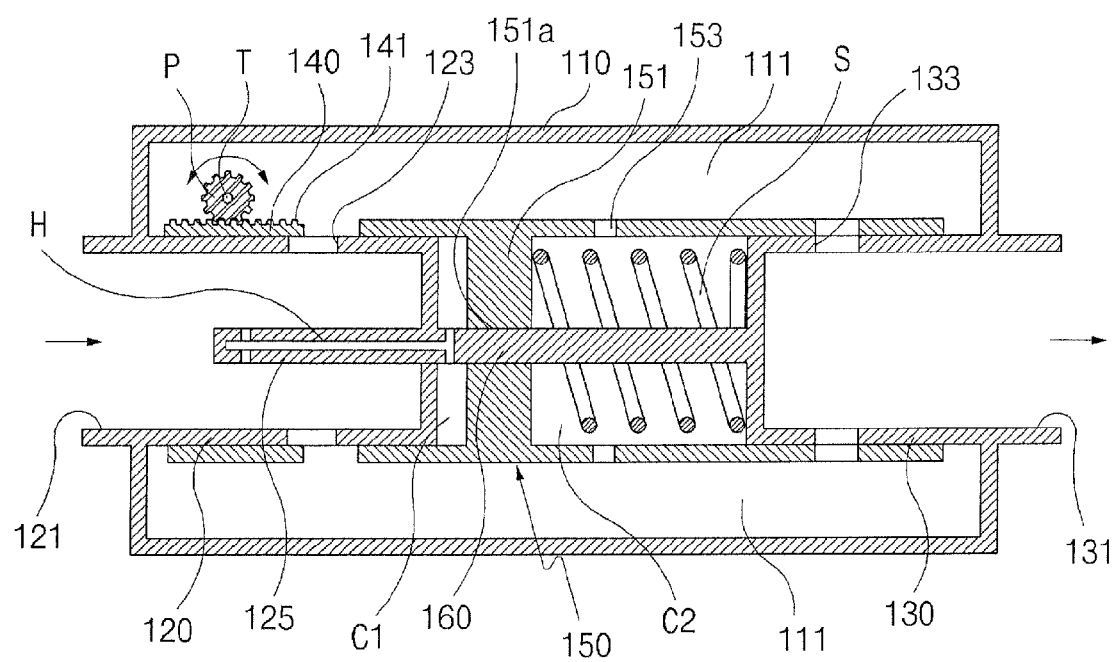
FIG. 1 is a cross-sectional view of a flow control valve according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described with reference to the accompanying drawings. Terminologies or terms used throughout the present specification or claims should not be interpreted as general or lexical meaning, and may need to be understood as meaning and concepts corresponding to technical spirit of the invention based on a principle that the inventor may appropriately define the terms to describe the inventor's invention according to a best mode.

Accordingly, embodiments and drawings of the present invention are only examples and thus may not represent all the technical spirit of the invention. Accordingly, it may be understood that the scope of the invention may be defined by various equivalents and modifications.

FIG. 1 is a cross-sectional view of a flow control valve according to an embodiment of the present invention.

The flow control valve may include a valve body 110 including a flow passage 111, a first poppet 120 being fixed within one side of the valve body 110, and including an inlet port 121 through which a fluid flows in and an outflow hole 123 through which the fluid flows out to the flow passage 111 of the valve body 110, a second poppet 130 being fixed within another side of the valve body 110, and including an outlet port 131 through which the fluid flows out and an inflow hole 133 through which the fluid flows in from the flow passage 111 of the valve body 110, a sleeve 140 sliding along an outer circumferential surface of the first poppet 120 by an actuator to close the outflow hole 123 of the first poppet 120 and to regulate an area of the outflow hole 123, and a spool 150 being disposed between the first poppet 120 and the second poppet 130 to be slidable along the outer circumferential surface of the first poppet 120 and the second poppet 130, being elastically supported by the second poppet 130, and sliding by a pressure of the fluid flowing in the first poppet 120 to close the inflow hole 133 of the second poppet 130 and to regulate an area of the inflow hole 133.

The inlet port 121 of the first poppet 120 may form an inlet of the flow control valve, and the outlet port 131 of the second poppet 130 may form an outlet of the flow control valve.

The first poppet 120 and the second poppet 130 may be provided within the valve body 110. The flow passage 111 may be formed by an inner circumferential surface of the valve body 110 and the outer circumferential surface of the first poppet 120 and the second poppet 130.

A rack 141 may be provided on one surface of the sleeve 140. The actuator may include a pinion P that is engaged with the rack 141 to be rotated by a drive unit.

The drive unit may employ various types of schemes, for example, an electric motor scheme, a pneumatic scheme, a hydraulic scheme, and the like. For a more precise control, a direct current (DC) electric motor may be used for the drive unit. The pinion P may be mounted onto a drive shaft T and rotate together with the drive shaft T. The drive shaft T may be connected with the DC electric motor to more accurately control the sleeve 140.

The spool 150 may be provided in a form of a pipe of which both ends are open, and may include a partition wall 151 to divide the spool 150 into two portions. Another side of the first poppet 120 and another side of the second poppet 130 may be inserted into both open ends of the spool 150, respectively. A first chamber C1 may be formed between the other side of the first poppet 120 and the partition wall 151 to be connected with the first poppet 120. An elongated hole H through which the fluid flows in and out may be formed in the other side of the first poppet 120.

Specifically, the first chamber C1 may be formed by the spool 150 and the other side of the first poppet 120 that is inserted into the spool 150. The first chamber C1 may be connected with the first poppet 120 using the elongated hole H.

A second chamber C2 may be formed between the other side of the second poppet 130 and the partition wall 151 of the spool 150. A spring S may be provided within the second chamber C2 to elastically support the spool 150. A connecting hole 153 may be formed in the spool 150 to connect the second chamber C2 with the flow passage 111 of the valve body 110.

Specifically, the second chamber C2 may be formed by the spool 150 and the other side of the second poppet 130 inserted into the spool 150. One end of the spring S received within the second chamber C2 may be supported by the other side of the second poppet 130, and another end of the spring S may be supported by the partition wall 151 of the spool 150.

A guide hole 151a may be formed in the partition wall 151 of the spool 150. The other side of the first poppet 120 and the other side of the second poppet 130 may be connected with a guide bar 160 passing through the guide hole 151a of the partition wall 151 to guide sliding of the spool 150. An internally protruded protrusion 125 may be formed in the first poppet 120. An inlet of the elongated hole H may be formed in the protrusion 125 and an outlet of the elongated hole 125 may be formed in the guide bar 160.

The guide bar 160 may connect the first poppet 120 and the second poppet 130 through the first chamber C1 and the second chamber C2 of the spool 150.

The elongated hole H may be formed across the protrusion 125 and the guide bar 160 positioned within the first chamber C1, so that the fluid within the first poppet 120 may smoothly flow into the first chamber C1.

Hereinafter, an operation effect of the flow control valve constructed as above according to an embodiment of the present invention will be described.

Figure 2:
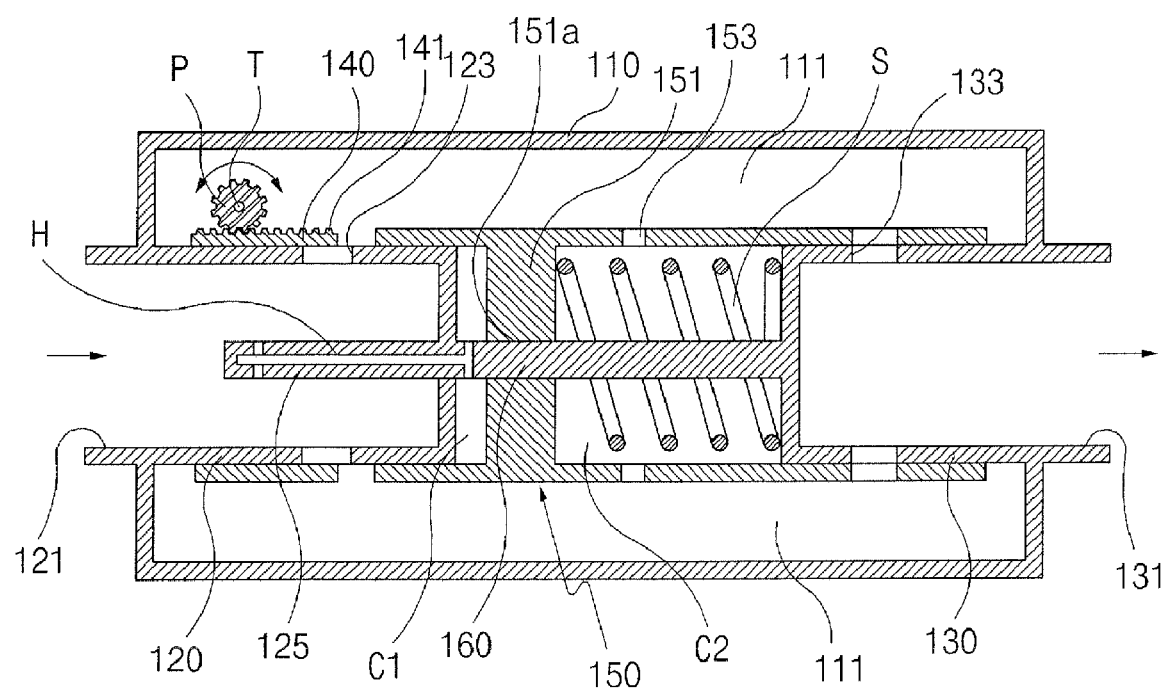
FIG. 2 is a cross-sectional view of a flow control valve for describing a sliding operation of a sleeve of the flow control valve of FIG. 1.
Figure 3:
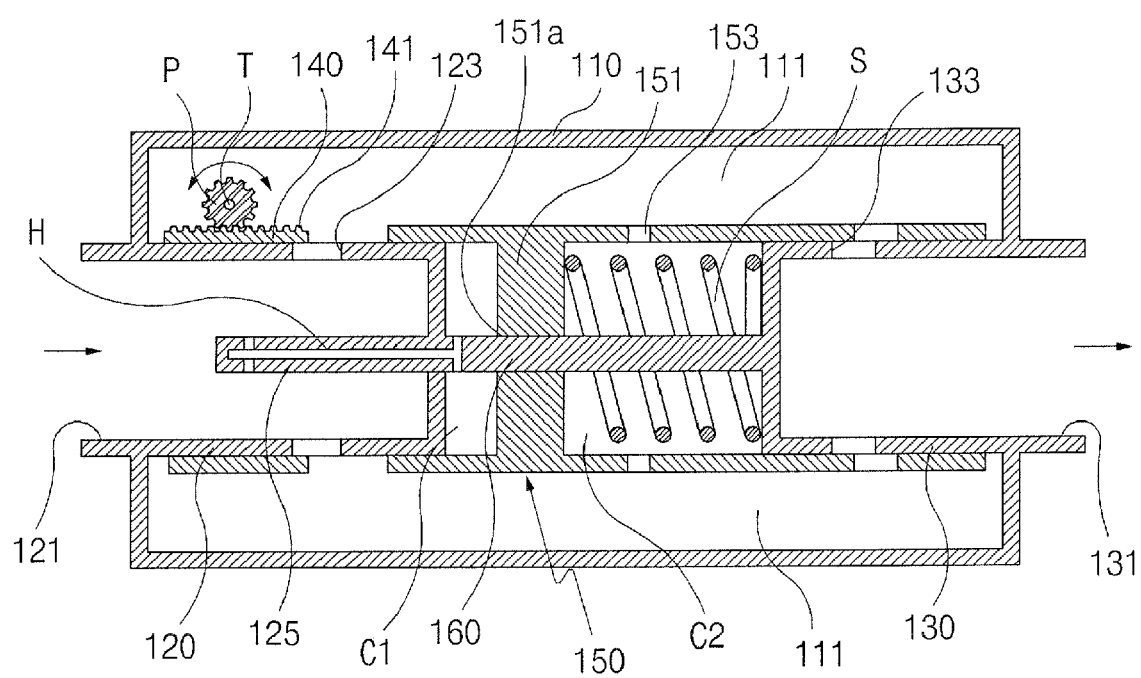
FIG. 3 is a cross-sectional view for describing an operation state when a high pressure suddenly occurs in an inlet port of a first poppet of the flow control valve of FIG. 1.

FIG. 2 is a cross-sectional view of a flow control valve for describing a sliding operation of the sleeve 140 of the flow control valve of FIG. 1, and FIG. 3 is a cross-sectional view for describing an operation state when a high pressure suddenly occurs in the inlet port 121 of the first poppet 120 of the flow control valve of FIG. 1.

The fluid in the inlet port 121 of the first poppet 120 may be discharged through the outlet port 131 of the second poppet 130. Specifically, the fluid may flow into the flow passage 111 of the valve body 110 through the outflow hole 123 of the first poppet 120. The fluid within the flow passage 111 may flow into the second poppet 130 through the inflow hole 133 of the second poppet 130.

The fluid within the first poppet 120 may flow into the first chamber C1 through the elongated hole H.

Hereinafter, a method of regulating the entire flow rate of the flow control valve will be described. As shown in FIG. 2, the flow rate of the fluid flowing from the first poppet 120 to the flow passage 111 of the valve body 110 may be regulated in such a manner that the sleeve 140 closes the outflow hole 123 of the first poppet 120.

Specifically, the rack 141 disposed on one surface of the sleeve 140 may be engaged with the pinion P. The sleeve 140 may slide along an outer circumferential surface of the first poppet 120 by a rotation of the pinion P mounted onto the drive unit. Due to sliding of the sleeve 140, the sleeve 140 may partially close the outflow hole 123 of the first poppet 120 to thereby regulate an area of the outflow hole 123.

Specifically, the area of the outflow hole 123 of the first poppet 120 may be controlled by sliding of the sleeve 140. Accordingly, when the area of the outflow hole 123 increases, the flow rate of the flow control valve may also increase. Conversely, when the area of the outflow hole 123 decreases, the flow rate of the flow control valve may also decrease.

The drive unit rotating the pinion P may include a DC electric motor and thereby may accurately manipulate the sleeve 140. Also, it is possible to reduce a weight of the flow control valve by controlling the sleeve 140 using the DC electric motor.

Due to a pressure increase in the inlet port 121 of the first poppet 120 or a pressure decrease in the outlet port 131 of the second poppet 130, a pressure difference between inlet port 121 of the first poppet 120 and outlet port 131 of the second poppet 130. Hereinafter, the above case will be described.

When the pressure in the inlet port 121 of the first poppet 120 suddenly increases, a volume of the first chamber C1 may suddenly increase as shown in FIG. 3. Specifically, the increased pressure of the inlet port 121 may be transferred to the first chamber C1 through the elongated hole H. Accordingly, the spool 150 may slide towards the second poppet 130. Here, sliding of the spool 150 may be guided by the guide bar 160.

The slid spool 150 may partially close the inflow hole 133 of the second poppet 130 to thereby regulate an area of the inflow hole 133. Specifically, due to the pressure increase in the inlet port 121 of the first poppet 120, the flow rate of the fluid flowing out through the outflow hole 123 of the first poppet 120 may increase. However, due to sliding of the spool 150, the area of the inflow hole 133 may decrease. Accordingly, the flow rate of the fluid passing through the inflow hole 133 of the second poppet 130 may be the same as the flow rate before the pressure increase occurs. Specifically, although the fluid flows in the flow control valve at a suddenly high pressure, the constant flow rate may be maintained in the flow control valve at all times.

How much the spool 150 closes the inflow hole 133 of the second poppet 130 may be determined based on the fact that a force by a pressure of the first chamber C1 and a pressure of the second chamber C2, and a restoring force of the spring S make a balance.

When the spool 150 slides, the connecting hole 153 may function to make the fluid flow in and out between the second chamber C2 and the flow passage 111.

When the pressure in the inlet port 121 of the first poppet 120 decreases, the spool 150 may slide to its original location due to the restoring force of the spring S. Specifically, due to sliding of the spool 150, the area of the inflow hole 133 of the second poppet 130 may be enlarged. Accordingly, the constant flow rate may be maintained in the flow control valve at all times.

As described above, when the sudden pressure change occurs in an inlet or an outlet of the flow control valve, the spool 150 may regulate the area of the inflow hole 133 of the second poppet 130 to thereby maintain the constant flow rate at all times.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A flow control valve comprising:
a valve body including a flow passage;
a first poppet being fixed within one side of the valve body, and including an inlet port through which a fluid flows in and an outflow hole through which the fluid flows out;
a second poppet being fixed within another side of the valve body, and including an outlet port through which the fluid flows out and an inflow hole through which the fluid flows in from the flow passage of the valve body;
a sleeve sliding along an outer circumferential surface of the first poppet by an actuator to close the outflow hole of the first poppet and to regulate an area of the outflow hole; and
a spool being disposed between the first poppet and the second poppet to be slidable along the outer circumferential surface of the first poppet and the second poppet, being elastically supported by the second poppet, and sliding due to a pressure of the fluid flowing in the first poppet to close the inflow hole of the second poppet and to regulate an area of the inflow hole.

2. The flow control valve of claim 1, wherein:
the spool is provided in a form of a pipe of which both ends are open, and includes a partition wall to divide the spool into two portions,
another side of the first poppet and another side of the second poppet are inserted into both open ends of the spool, respectively, and
a first chamber is formed between the other side of the first poppet and the partition wall of the spool to be connected with the first poppet, and an elongated hole through which the fluid flows in and out is formed in the other side of the first poppet.

3. The flow control valve of claim 2, wherein:
a second chamber is formed between the other side of the second poppet and the partition wall of the spool, and a spring is provided within the second chamber to elastically support the spool, and
a connecting hole is formed in the spool to connect the second chamber with the flow passage of the valve body.

4. The flow control valve of claim 2, wherein:
a guide hole is formed in the partition wall of the spool,
the other side of the first poppet and the other side of the second poppet are connected with a guide bar passing through the guide hole of the partition wall to guide sliding of the spool, and
an internally protruded protrusion is formed in the first poppet, and an inlet of the elongated hole is formed in the protrusion and an outlet of the elongated hole is formed in the guide bar.

5. The flow control valve of claim 1, wherein:
a rack is provided on one surface of the sleeve, and
the actuator includes a pinion that is engaged with the rack of the sleeve to be rotated by a drive unit.

6. The flow control valve of claim 5, wherein the drive unit includes a direct current (DC) electric motor.

* * * * *